(12) United States Patent
Bigaj et al.

(10) Patent No.: US 11,488,036 B2
(45) Date of Patent: Nov. 1, 2022

(54) MULTI-CLASS CLASSIFICATION EVALUATION METRIC DETERMINATION

(71) Applicant: INTERNATIONAL BUSINESS MACHINES CORPORATION, Armonk, NY (US)

(72) Inventors: Rafal Bigaj, Cracow (PL); Lukasz G. Cmielowski, Cracow (PL); Bartlomiej Tomasz Malecki, Slomniki (PL); Wojciech Sobala, Cracow (PL)

(73) Assignee: International Business Machines Corporation, Armonk, NY (US)

(*) Notice: Subject to any disclaimer, the term of this patent is extended or adjusted under 35 U.S.C. 154(b) by 418 days.

(21) Appl. No.: 16/797,126

(22) Filed: Feb. 21, 2020

(65) Prior Publication Data

US 2021/0089942 A1 Mar. 25, 2021

(30) Foreign Application Priority Data

Sep. 24, 2019 (EP) .................................. 19199214

(51) Int. Cl.
*G06N 3/02* (2006.01)
*G06N 5/04* (2006.01)
*G06N 20/00* (2019.01)
*G06N 20/10* (2019.01)

(52) U.S. Cl.
CPC .............. *G06N 5/04* (2013.01); *G06N 5/045* (2013.01); *G06N 20/00* (2019.01); *G06N 20/10* (2019.01)

(58) Field of Classification Search
CPC .......... G06N 5/04; G06N 20/00; G06N 20/10; G06N 5/045
USPC ..................................... 707/600–899; 706/20
See application file for complete search history.

(56) References Cited

U.S. PATENT DOCUMENTS

| 2009/0164416 | A1* | 6/2009 | Guha ...................... G06F 16/31 |
| 2016/0092790 | A1 | 3/2016 | Ribeiro Mendes Júnior |
| 2017/0103331 | A1 | 4/2017 | Bilal |
| 2017/0228652 | A1 | 8/2017 | Dong |

* cited by examiner

*Primary Examiner* — Isaac M Woo
(74) *Attorney, Agent, or Firm* — Brandon L. Stephens

(57) ABSTRACT

A computer-implemented method for determining an evaluation metric value for a multi-class classifier with unknown labels may be provided. The method comprises providing a trained classifier system for classifying input data vectors resulting in a plurality of result label values and respective probability vectors, predicting, based on received input data vectors, result label values and respective probability vectors, and receiving feedback data comprising respective feedback label values. The method comprises also mapping each of the feedback label values to a respective highest probability dimension value of the related probability vector resulting in an index map, and determining, based on the index map, an evaluation metric value for the quality of the trained classifier system.

20 Claims, 5 Drawing Sheets

MULTI-CLASS CLASSIFICATION EVALUATION METRIC DETERMINATION

BACKGROUND

The invention relates generally to an evaluation of the quality of an artificial intelligence (AI) system, and more specifically, to a computer-implemented method for determining an evaluation metric value for a multi-class classifier with unknown labels. The invention relates further to a system for determining an evaluation metric value for a multi-class classifier with unknown labels, and a computer program product.

The acceptance rate of artificial intelligence (AI) technologies and systems is increasing across society and more and more AI applications and systems are integrated into consumer facing applications as well as into traditional enterprise applications, like transactional systems or call-center applications. AI technologies come typically in the form of machine-learning (ML) based methods that need training in some form or the other. One of the most predominant ML techniques is used for a classification of unknown input data. Such classifiers are typically trained with known training data/prediction result couples during a supervised learning process. Normally, the number of classes which can be classified, and the related labels are fixed for a given ML system.

SUMMARY

According to one aspect of the present invention, a computer-implemented method for determining an evaluation metric value for a multi-class classifier with unknown labels may be provided. The method may comprise providing a trained classifier system for classifying input data vectors resulting in a plurality of result label values and respective probability vectors, predicting, based on received input data vectors, result label values and respective probability vectors, and receiving feedback data comprising respective feedback label values.

Moreover, the method may comprise mapping each of the feedback label values to a respective highest probability dimension value of the related probability vector resulting in an index map, and determining, based on the index map, an evaluation metric value for the quality of the trained classifier system.

According to another aspect of the present invention, a system for determining an evaluation metric value for a multi-class classifier system with unknown labels may be provided. The system may comprise a trained classifier system for classifying input data vectors resulting in a plurality of result label values and respective probability vectors, wherein the classifier system is adapted for predicting, based on received input data vectors, result label values and respective probability vectors.

The system may further comprise means for receiving feedback data comprising respective feedback label values, means for mapping each of the feedback label values to a respective highest probability dimension value of the related probability vector resulting in an index map, and means for determining, based on the index map, an evaluation metric value for the quality of the trained classifier system.

The proposed computer-implemented method for determining an evaluation metric value for a multi-class classifier with unknown labels may offer multiple advantages, and technical effects, contributions and/or improvements:

The problem of not being able to evaluate ML models from well-known AI frameworks can be overcome. In particular, those multi-class classifiers delivering only a prediction result label value and a probability vector with an unknown mapping of all possible prediction result labor values and related probability vector elements may be enhanced in a way, so that automatic evaluation systems which have to have information about a probability vector mapping to respected label values in order to perform proper ML model evaluations.

For this, the here proposed method may use second input data—in particular user input data—in the form of confirmed class labor values of the predicted label value for a set of input data. Thus, even if the prediction process of the ML model may deliver a wrong predicted label value, the input data clearly has the correct label value.

This way, a good confirmation and probability vector element to label value mapping may be generated. However, if the multi-class classifier may be adapted for a classification into several hundred classes, it may easily be possible that for many of the elements of the prediction probability vector no user input data exist. In typical applications, a limited number—let's say a handful—of prediction label results are dominant for the ML system. Hence, there may be only little or no prediction label results for "rare cases" of classes, i.e., those classes of the multi-class classifier with a rare occurrence.

In a nutshell, one might say that the determination of the evaluation metric value is dependent on the predicted class—i.e., the predicted result label, the related probability vector and manual feedback data.

One of the additional advantages of the here proposed method is that it may become possible to build mean values for probability element values to approximate probability vectors with now generated known label relationships (i.e., mappings). Based on this, an evaluation of the ML model using automated evaluation systems for ML models becomes advantageously possible. This was not the case, for a large number of standard ML frameworks for multi-class classifiers with a large number of classes with a comparably high number of rare cases as well as the comparably small number of dominant cases of labels.

In the following, additional embodiments of the inventive concept—applicable for the method as well as for the system—will be described.

According to an advantageous embodiment, the method may also comprise determining for those dimensions—all of them may be treated equal—of the related probability vector, for which not any feedback label values are available, a mean probability value to be used for all those dimensions—in particular of the probability vector—for which not any feedback label values are available. The requirement for this activity may not be a rare case. Typically, feedback data may be received for a limited number of dimensions such that feedback data for a portion of the potential classes of the classifier does not exist. In particular, if the number of classes and thus the number dimensions of the probability vector may be comparably high, the probability that feedback data may not exist for all classes is relatively high. Experimental results show that a good evaluation metric value for the classifier system may be achieved if mean values are used for those classes for which no feedback data exist.

According to one optional embodiment, the method may also comprise determining an estimation error for a standard error of the mean probability value from a distribution of the probability values of all classes, for which not any feedback label values are available. This may also be used for a determined error term of the evaluation metric value for the trained classifier system.

According to a useful embodiment, the method may also comprise performing the mapping and the determining after a predefined number of feedback data records have been received. Thus, the evaluation of the classifier system may be performed dynamically, i.e., after enough feedback data has been received to perform an evaluation of the classifier system with a meaningful outcome.

Alternatively, the evaluation may be performed prescheduled, i.e., the performing the mapping and the determining based on a predefined schedule may be executed in predefined time intervals. It may be noted that this does not have to be performed after equally long time periods but according to a schedule that reflects the typical usage of the classifier system. The typical usage may be derived and determined based on an analysis of previous prediction activities of the classifier system. The previous prediction activities may have undergone an off-line analysis.

According to one permissive embodiment of the method, the index map may have only mapping values for a subset of classes. This may be a consequence of the fact that the number of prediction runs is limited compared to that dimension of the input data vector, i.e., the feature vector.

According to one advantageous embodiment of the method, the evaluation metric is a log-loss metric or a Brier loss metric. It may be understood, that these metrics are mentioned here as examples and that the metrics may be equally acceptable. However, it has been experimentally proven that these two metrics may provide the best results for the quality evaluation of the classifier system.

According to practical embodiments of the method, the trained classifier system may be based on a framework selected out of the group comprising scikit, spark ml, keras, caffe, pytorch and, tensorflow. All of these techniques are based on open source libraries for machine-learning. E.g., spark ml or SparkML is today managed by the Apache foundation; keras is an open source deep-learning library written in Python; caffe is also a deep learning framework developed by the Berkeley AI Center and has been released under the BSD 2-clause license. Also, pytorch is available under an open-source license. It may also be mentioned that also other ML frameworks may be used that deliver comparable results (labels and probability vectors for classification problems). Any version of the above mentioned frameworks may be used.

According to a further advantageous embodiment of the method, the trained classifier system may be based on a neural network. For this, one of the above-mentioned library frameworks for machine-learning may be used. Alternatively, other open-source and also proprietary technologies may be used to implement the trained classifier system.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
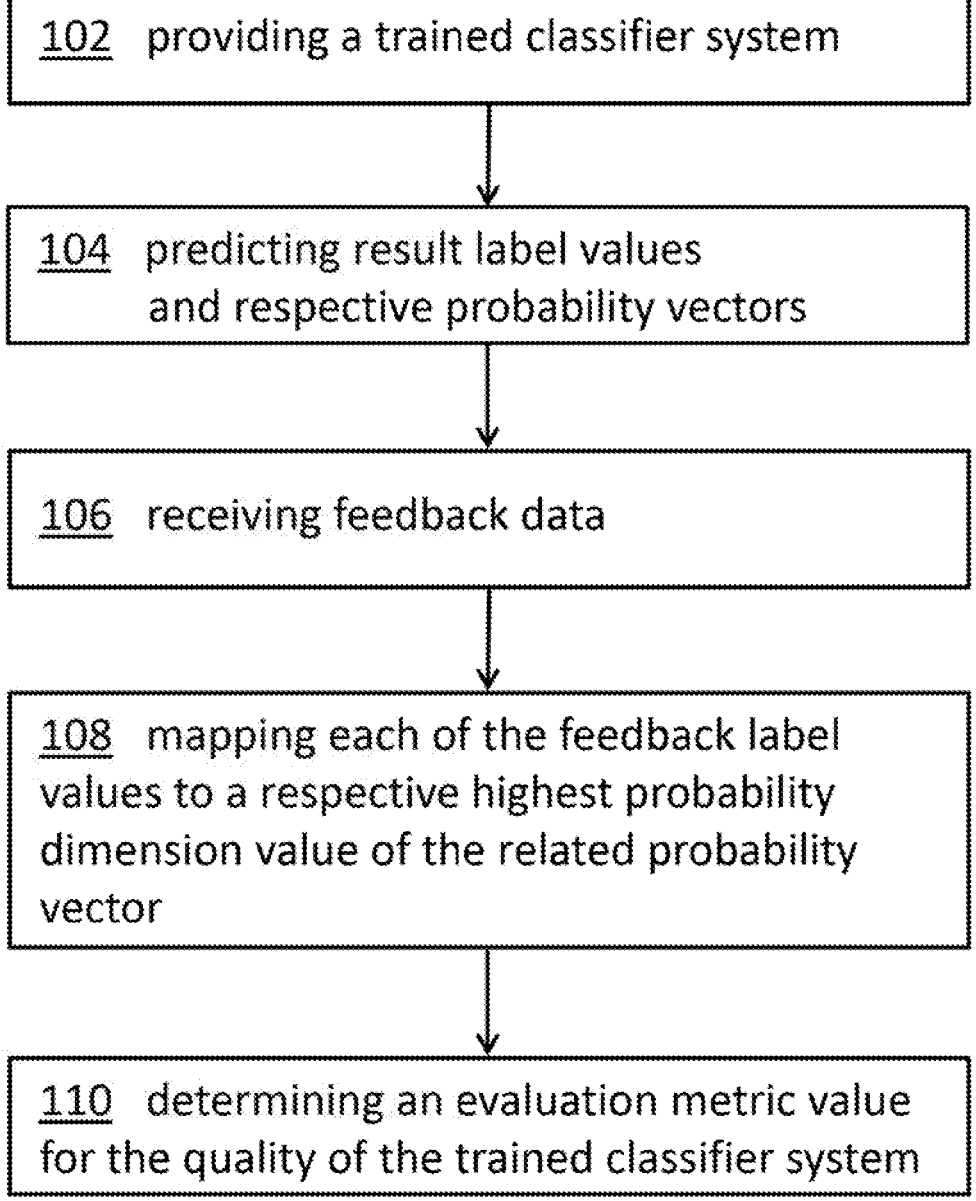

Preferred embodiments of the invention will be described, by way of example only, and with reference to the following drawings:

FIG. 1 shows a block diagram of an embodiment of the inventive computer-implemented method for determining an evaluation metric value for a multi-class classifier with unknown labels.

Figure 2:
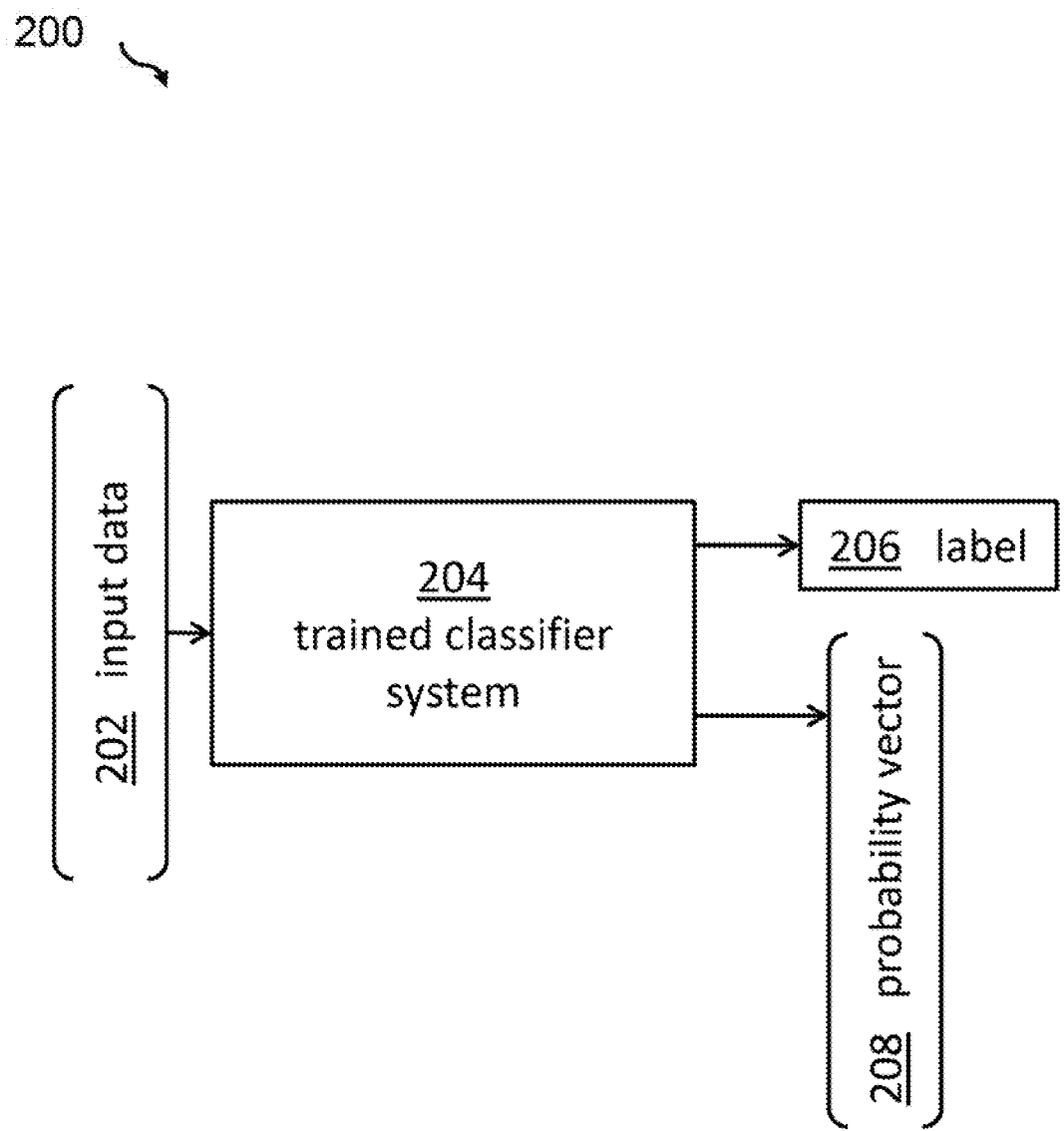

FIG. 2 shows a diagram of a trained multi-class classifier system enabled to predict a label value out of a plurality of defined label values based on input data.

Figure 3:
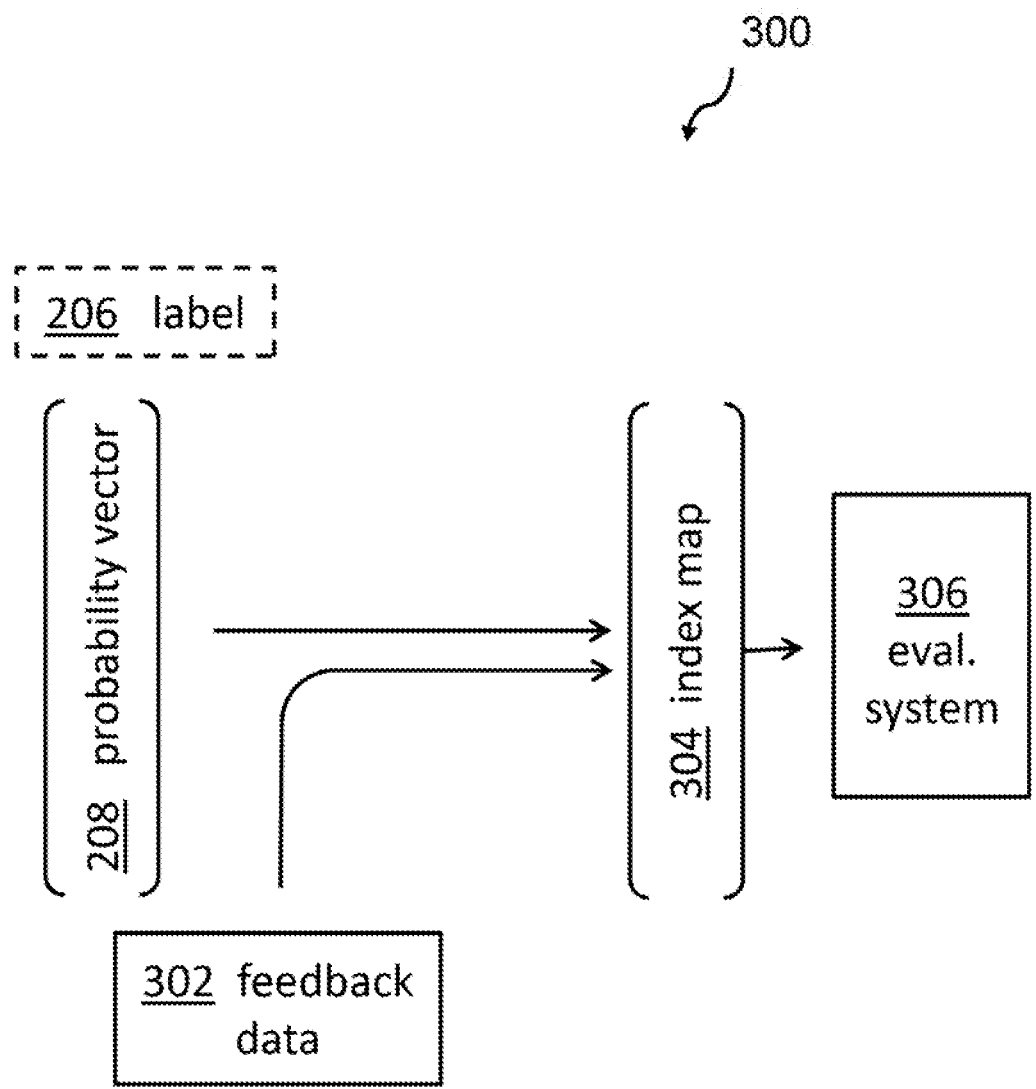

FIG. 3 shows a block diagram of the inference results of the classifier, the result label value and the probability vector with feedback data and a link to the evaluation system.

Figure 4:
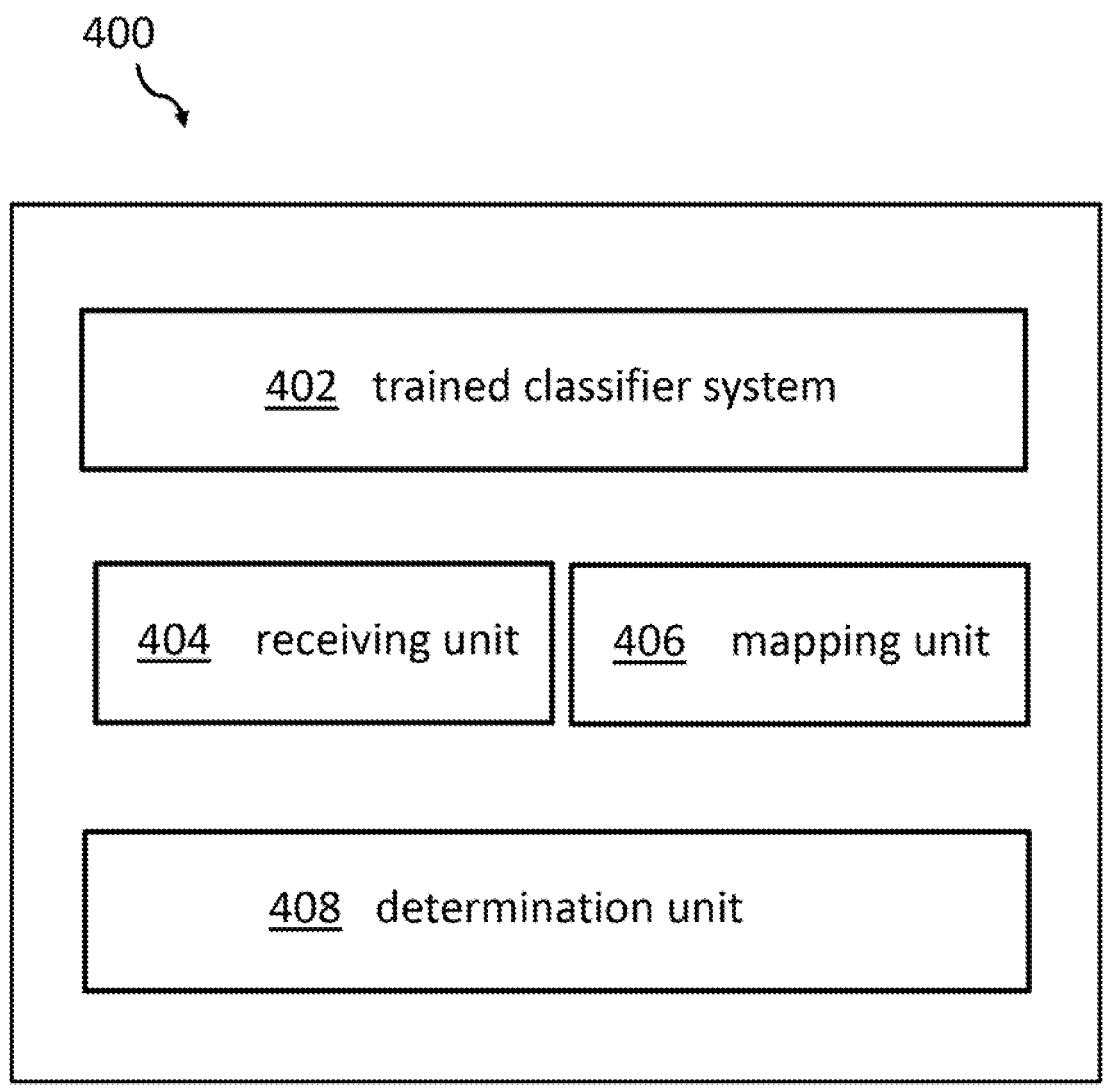

FIG. 4 shows a block diagram of an embodiment of the system for determining an evaluation metric value for a multi-class classifier with unknown labels.

Figure 5:
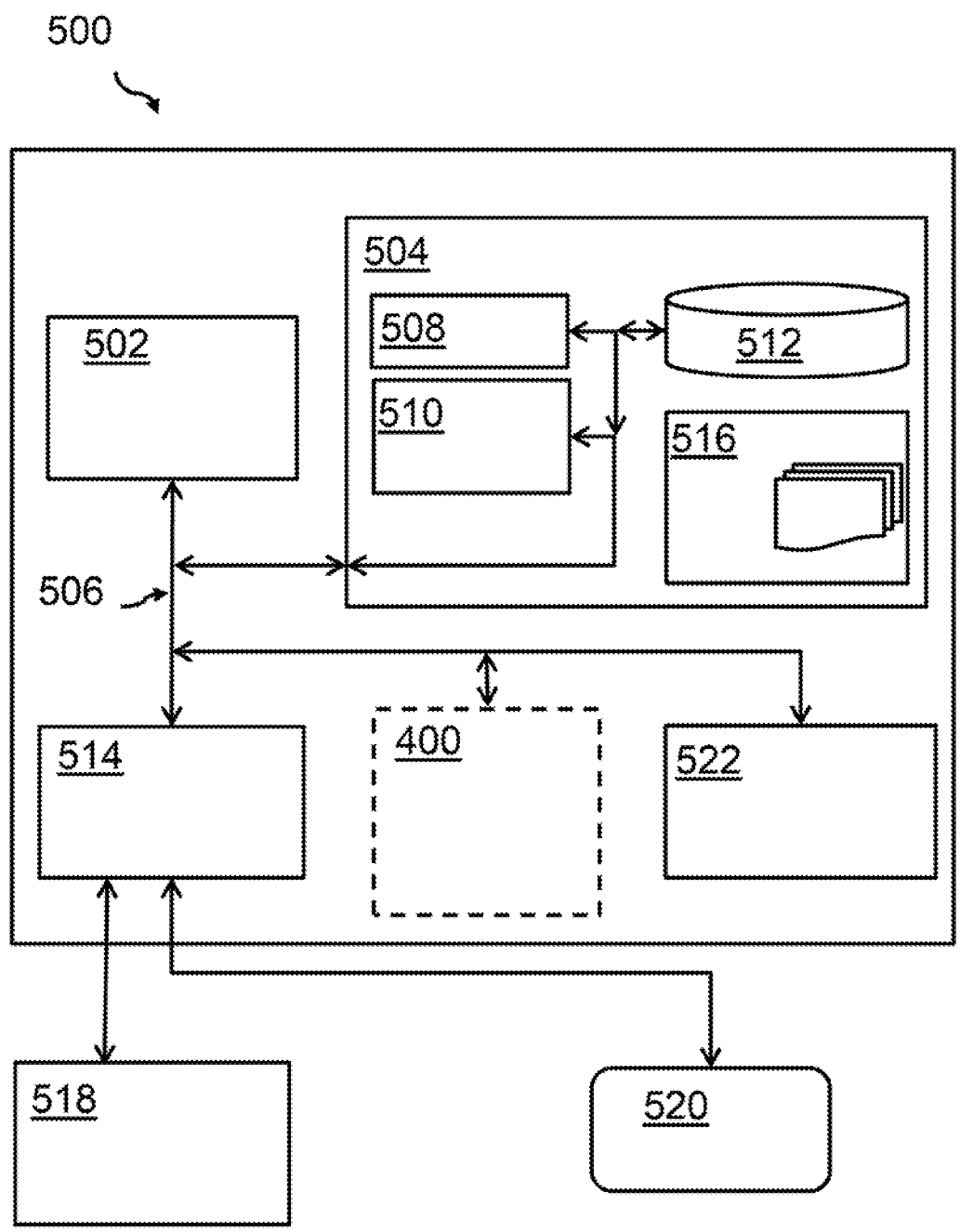

FIG. 5 shows an embodiment of a computing system comprising the system for determining the evaluation metric value according to FIG. 4.

DETAILED DESCRIPTION

In the context of this description, the following conventions, terms and/or expressions may be used:

The term 'evaluation metric value' may denote a result of an evaluation process applying a specific and predefined metric for determining a quality of a machine-learning system, e.g., the classifier system used within the proposed concept.

The term 'multi-class classifier' may denote a machine-learning method and/or related system for classifying unknown data—in particular, input data values, e.g., in the form of feature vectors—into a predefined number of classes. The number of classes may vary from very low numbers (e.g., 3) to several thousand classes. The classifier system, referred to by this document, is meant to be an example of an applied supervised machine learning concept. The classifier may be trained with training data: known input with labels referring to the correct result of a production process of the classifier system. After such training, the classifier system shall be enabled to categorize—namely, predict—unknown data into corresponding classes. In addition to such a result label, the classifier system may also output a probability vector, wherein each of the dimensions of the probability vector may denote a probability for the unknown received data to belong to a corresponding class. However, the sequence of classes in the probability vector is—for the purpose of this document—not given. This may be the case for most and practical used machine-learning frameworks.

Because of this, a determination, i.e., evaluation, of the quality and performance in terms of accuracy of the classifier system is not possible. Hence, feedback data may be required.

The term 'label' may denote an identifier of a class for unknown data used as input data vector to a classifier system. Such a label may be denoted as a result label (value). In contrast to this, the labels may also be used during the training of the machine-learning system. As known in the art, machine-learning systems—particular those of the category supervised learning—may be trained using known input data together with known related labels.

The term 'trained classifier system' may denote a machine-learning system adapted to classify unknown input data into one out of a predefined number of classes. The classifier system shall be trained with training data before it is used under the here proposed concept.

The term 'result label value' may denote an output of the trained classifier system for a specific input data set, i.e., input vector or feature vector.

The term 'probability vector' may denote a vector with the dimension of the number of potential classes to be predicted by the trained classifier system. Together with each result label value, a probability vector may be generated. However, the sequence of the relating classes to the dimensions of the vector may be assumed to be unknown for the purpose of this document. Each dimension of the probability vector may be the probability that the feature vector (the input vector) should be categorized into the particular class relating to the dimension of the probability vector.

The term 'feedback data' may denote specific label values—in particular, feedback label values—that may have been determined by a human in contrast to the classifier system output, the predicted label. The predicted label may be wrong for a specific input data vector, i.e., a specific feature vector. Although the probability of a specific feature vector to belong to a specific class may be 90+ percent, there may still be feature vectors that may not be categorized, i.e., classified or predicted correctly. However, this may be important information for an evaluation process of the classifier system.

Because the sequence of classes in the probability vector may be stable but unknown, the feedback data need to be mapped to the probability vector. Thereby, the label of the feedback data may be mapped to the dimension of the probability vector having the highest probability of all dimensions of a specific probability vector.

The term 'index map' may denote a vector (or matrix) showing a relationship between a manually classified label—resulting from the peak vector data—and dimension of the probability vector.

The term 'log-loss' may denote an evaluation for a classifier. The goal of classifier systems may be seen as predicting one class for the very high probability—e.g., above 90%—wherein all other probabilities for the other classes may be as small as possible. A perfect model has a log-loss of 0. A log-loss value may increase as the predicted probability deviates from the actual correct label. As an example, predicting a probability of 0.12 when the actual correct label is 1 would result in a high log-loss value. In contrast to an accuracy (metric), which can be seen as a prediction where the predicted value equals the actual value, the log-loss method may take into account the uncertainty of the prediction based on how much from the actual label is present. This may give a more nuanced view of the performance of a specific classifier system.

The term 'Brier loss metric' may denote another way to measure the accuracy of probabilistic predictions. It may be seen as a calibration measure, i.e., the lower the Brier score is, the better the predictions are calibrated. It may be used in cases in which a differentiation between true and false is possible.

In order to make assessments about the quality of a multi-class classification ML system, it is common to use evaluation metrics which are determined based on predicted probability values. However, for this it is a requirement that a label/probability position of the label in a probability vector is known.

However, various ML frameworks deliver as a prediction output of a multi-close classification process only (i) the predicted target, i.e., the predicted label value, and a probability vector, i.e., an array with probability values for each class but wherein the sequence of the classes, i.e., the sequence of the labels relating to the values in the probability vector, is unknown. However, the sequence is stable from prediction to prediction, i.e., from input data set to input data set.

The problem begins, when an automatic system that evaluates the ML model may not have any knowledge about the probability vector mapping to the label values. Up to now, in such a situation there is no way to calculate metric values automatically.

In this context, some technologies are already known: the document US 2017/0103331 A1 discloses a method to evaluate the prediction of a possibly unknown outcome art of a plurality of predictions of the outcome. The method begins with assessing a particular prediction of an outcome out of a plurality of predictions of that outcome in which the outcome may be unknown.

In another example, e.g., in document US 2016/0092790 A1, a method is proposed which may be used for a classification and open-set scenarios, wherein it is often not possible to first obtain the training data for possible classes that may arise during the testing stage. During the test phase, test samples belonging to one of the classes used in the training phase are classified based on a ratio between similarity scores, known as correct class and test samples, belonging to any other class are to be rejected and classified as unknown.

However, none of the known documents seem to address the problem of an unknown label value probability value in the probability vector of a multi-class classifier in commonly used ML frameworks.

In the following, a detailed description of the figures will be given. All instructions in the figures are schematic. Firstly, a block diagram of an embodiment of the inventive computer-implemented method for determining an evaluation metric value for a multi-class classifier with unknown labels is given. Afterwards, further embodiments, as well as embodiments of the system for determining an evaluation metric value for a multi-class classifier with unknown labels, will be described.

FIG. 1 shows a block diagram of a preferred embodiment of the computer-implemented method 100 for determining an evaluation metric value for a multi-class classifier with unknown label values; meaning that although all labels may be given, they remain unknown; in particular, the sequence of a related probability vector may be unknown.

The method 100 comprises providing, 102, a trained classifier system—i.e., a machine-learning system of the class supervised learning—for classifying input data vectors—in particular a plurality of input data vectors into classes—resulting in a plurality of result label values and respective probability vectors. Basically, each predicted result label value may also have a related vector of probabilities for all potential classes. However, the classes relating to the values in the probability vector remain unknown.

The method 100 also comprises predicting, 104, based on received input data vectors—also denoted as feature vectors—result label values and respective probability vectors, and receiving, 106—in particular from one or more users—feedback data comprising respective feedback label values. The feedback data label value may be identical to the predicted label value (good result) but may also be different to the predicted label value. This difference for a given set of input data values may deliver the basis for an evaluation of the quality of the classifier system.

The method 100 also comprises mapping, 108, each of the feedback label values to a respective highest probability dimension value of the related probability vector. In other words, this describes the creation of the index map: the positions of labels for the most often predicted classes are clearly mapped to values (dimensions) in the probability vector.

Last but not least, the method 100 comprises determining, 110, based on the determined index map, an evaluation metric value for the quality of the trained classifier system. Fundamentally, the proposed method may be independent of the evaluation metric. However, the fundamental data required for performing the evaluation metric may be delivered by the proposed concept.

In a nutshell, the determination of the evaluation metric value is dependent on the probability of manually labelled and predicted classes.

FIG. 2 shows a diagram 200 of a trained multi-class classifier system 204 enabled to predict a label value 206 out of a plurality of defined label values based on input data 202 which may also be denoted as feature values. Besides the label value 206, another output of the trained multi-class classifier system 204 is the probability vector 208 comprising as elements probability values for each of the classes. However, it may remain unknown which element of the probability vector 208 belongs to which class. The only known thing may be that the sorting of classes to which the probability values of the probability vector 208 relate remains stable over time, i.e., from prediction to prediction.

FIG. 3 shows again a diagram 300 of the results of the inference process of the classifier (204, compare FIG. 2) the label value 206—which may or may not be used for this part of the description—and the probability vector 208. Feedback data 302 in the form of feedback label values relating to respective result label values of the prediction are received from user inputs for one or more of the prediction results so that an index map 304 can be created. The mapping is performed in a way that feedback label values are mapped to the respective highest probability value element of the probability vector. Over time, a mapping between probability vector dimensions and feedback label values will exist.

However—in particular for those ML systems with a large number of justification classes—the index map can be sparse meaning that not for all dimensions a label value may exist. However, this problem may be overcome with mean probability values for all unknown classes. In addition to the mean probability values, also an estimated error—e.g., using a root mean square method—may be determined.

It may also be mentioned that a feedback data record may comprise a feature vector, i.e., input data as well as related label values.

The evaluation system 306 for performing an evaluation of the trained classifier system 204 (compare FIG. 2) can be triggered either on schedule or, based on an appropriate number—in particular based on a threshold value—of feedback data records that have been collected.

A short example may illustrate the proposed method a little bit more:

As input data, a (comparably short) vector with a first, a second and a third feature f1, f2, f3 value may be assumed. Thus, the feedback data comprises the feature vector (f1, f2, f3) and the feedback label value.

It may further be assumed that the multi-class classifier system may classify input data into five classes of the following labor values: "A", "B", "C", "D", "E". However, as assumed above, the full set of labels is not known, nor in which order related probability values and the probability vectors are given. In other words, having values of the probability vector is insufficient to determine a probability for all of the given classes.

Therefore, the index map is built which assigns an index in the probability vector to a given class.

It may be assumed that a small feedback data set |f1|f2|f3||label value| is available:
|1|2|3|A|
|1|2|3|C|

The prediction result of the classifier system may look as follows:
|A|[0.8, 0.01, 0.04, 0.1, 0.5]
|B|[0.02, 0.88, 0.02, 0.05, 0.03]

Out of this, a spares index map can be built:
A→0,
B→1.

The unknown classes and the related positions of the probability vectors are: C, D and E.

If as an evaluation metric a log-loss metric value is determined for the first feedback data record, the situation is clear, because a true label from the feedback data record "A" is in the index map and therefore, the probability can easily be extracted from the probability vector: here it is 0.8.

The second feedback data record is more problematic, because the true label "C" is unknown", as well as a position of a probability value in the probability vector. Hence, the probability value for this label is going to be estimated from all probability values of unknown classes, resulting in: MEAN (0.02, 0.05, 0.03)=0.03333.

In addition to that the standard error (e.g., mean square error) can be determined and the metric value can be marked as estimated. This may be seen as an enrichment of the evaluation metric value for the ML model.

Hence, this approach allows evaluating the multi-class classification model even though the label values are not completely specified.

For completeness reasons, FIG. 4 shows a block diagram of the system 400 for determining an evaluation metric value for a multi-class classifier with unknown label values. The system comprises trained classifier system 402 for classifying input data vectors resulting in a plurality of result label values and respective probability vectors, wherein the classifier system is adapted for predicting, based on received input data vectors, result label values and respective probability vectors.

The system comprises as well means for receiving feedback data—in particular, a receiving unit 404—comprising respective feedback label values, and means for mapping 406—in particular, a mapping unit 406—each of the feedback label values to a respective highest probability dimension value of the related probability vector resulting in an index map, and means for determining—in particular, a determination unit 408—based on the index map, an evaluation metric value for the quality of the trained classifier system.

Embodiments of the invention may be implemented together with virtually any type of computer, regardless of the platform being suitable for storing and/or executing program code. FIG. 5 shows, as an example, a computing system 500 suitable for executing program code related to the proposed method.

The computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the system 400 for determining an evaluation metric value for a multi-class classifier with unknown labels may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell, the inventive concept can be summarized in the following clauses:

1. A computer-implemented method for determining an evaluation metric value for a multi-class classifier with unknown label values, the method comprising
   providing a trained classifier system for classifying input data vectors resulting in a plurality of result label values and respective probability vectors,
   predicting, based on received input data vectors, result label values and respective probability vectors,
   receiving feedback data comprising respective feedback label values,
   mapping each of the feedback label values to a respective highest probability dimension value of the related probability vector resulting in an index map, and
   determining, based on the index map, an evaluation metric value for the quality of the trained classifier system.
2. The method according to clause 1, also comprising
   determining for those dimensions of the related probability vector, for which not any feedback label values are available, a mean probability value to be used for all those dimensions for which not any feedback label values are available.
3. The method according to clause 2, also comprising
   determining an estimation error for a standard error of the mean probability value from distribution of the probability values of all classes, for which not any feedback label values are available.
4. The method according to any of the preceding clauses, also comprising
   performing the mapping and the determining after a predefined number of feedback data records have been received.
5. The method according to any of the preceding clauses, also comprising
   performing the mapping and the determining based on a predefined schedule.
6. The method according to any of the preceding clauses, wherein the index map has only mapping values for a subset of classes.
7. The method according to any of the preceding clauses, wherein the evaluation metric is a log-loss metric or a Brier loss metric.
8. The method according to any of the preceding clauses, wherein the trained classifier system is based on a framework selected out of the group comprising scikit, spark_ml, keras, caffe, pytorch and, tensorflow.
9. The method according to any of the preceding clauses, wherein the trained classifier system is based on a neural network.
10. A system for determining an evaluation metric value for a multi-class classifier with unknown label values, the system comprising
    a trained classifier system for classifying input data vectors resulting in a plurality of result label values and respective probability vectors,
    wherein the classifier system is adapted for predicting, based on received input data vectors, result label values and respective probability vectors,
    means for receiving feedback data comprising respective feedback label values,
    means for mapping each of the feedback label values to a respective highest probability dimension value of the related probability vector resulting in an index map, and
    means for determining, based on the index map, an evaluation metric value for the quality of the trained classifier system.
11. The system according to clause 10, also comprising
    means for determining for those dimensions of the related probability vector, for which not any feedback label values are available, a mean probability value to be used for all those dimension which not any feedback label values are available.
12. The system according to clause 11, also comprising
    means for determining an estimation error for a standard error of the mean probability value from distribution of the probability values of all classes, for which not any feedback label values are available.
13. The system according to any of the clauses 10 to 12, wherein the means for mapping are also adapted for performing the mapping and the determining after a predefined number of feedback data records have been received.
14. The system according to any of the clauses 10 to 13, wherein the means for mapping are also adapted for— performing the mapping and the determining based on a predefined schedule.
15. The system according to any of the clauses 10 to 14, wherein the index map has only mapping values for a subset of classes.
16. The system according to any of the clauses 10 to 15, wherein the evaluation metric is a log-loss metric or a Brier loss metric.
17. The system according to any of the clauses 10 to 16, wherein the trained classifier system is based on one a framework selected out of the group comprising scikit, spark_ml, keras, caffe, pytorch and, tensorflow.
18. The system according to any of the clauses 10 to 17, wherein the trained classifier system is based on a neural network.
19. A computer program product for determining an evaluation metric value for a multi-class classifier with unknown label values, said computer program product comprising a computer readable storage medium having program instructions embodied therewith, said program instructions being executable by one or more computing systems or controllers to cause said one or more computing systems to provide a trained classifier system for classifying input data vectors resulting in a plurality of result label values and respective probability vectors, predict, based on received input data vectors, result label values and respective probability vectors, receive feedback data comprising respective feedback label values, map each of the feedback label values to a respective highest probability dimension value of the related probability vector resulting in an index map, and determine, based on the index map, an evaluation metric value for the quality of the trained classifier system.

What is claimed is:

1. A computer-implemented method for determining an evaluation metric value for a multi-class classifier with unknown label values, the method comprising:

receiving, by a trained classifier system, one or more input data vectors, the trained classifier system capable of classifying input data vectors resulting in a plurality of result label values and respective probability vectors;

predicting, based on the one or more received input data vectors, result label values and respective probability vectors using the trained classifier system;

receiving feedback data, from one or more users, the feedback data comprising respective feedback label values;

mapping at least some of the feedback label values to a respective highest probability dimension value of the related probability vector resulting in an index map; and determining, based on the index map, an evaluation metric value for the quality of the trained classifier system; and using a mean probability dimension value for input data vectors that correspond to feedback label values and unknown label values which are omitted from the index map.

2. The method as in claim 1, wherein no feedback data is received for one or more of the input data vectors, further comprising:

determining a mean probability dimension value to be used for the input data vectors for which no feedback data is received, the mean probability dimension being based on the received feedback data.

3. The method as in claim 2, further comprising:

determining an estimation error for a standard error of the mean probability dimension value based on a distribution of the probability values of all the input data vectors for which not feedback data is received.

4. The method as in claim 1, wherein mapping the feedback label values and determining the evaluation metric value is performed after a predefined number of feedback data records have been received.

5. The method as in claim 1, wherein mapping the feedback label values and determining the evaluation metric value is performed on a predefined schedule.

6. The method as in claim 1, wherein the index map has only mapping values for a subset of classes.

7. The method as in claim 1, wherein the evaluation metric comprises at least one of the group consisting of: a log-loss metric, and a Brier loss metric.

8. The method as in claim 1, wherein the trained classifier system is based on a framework selected out of the group consisting of: scikit, spark ml, keras, caffe, pytorch and, tensorflow.

9. The method as in claim 1, wherein the trained classifier system is a neural network.

10. A system for determining an evaluation metric value for a multi-class classifier with unknown label values, the system comprising:

a computer system comprising, a processor, a computer readable storage medium, and program instructions stored on the computer readable storage medium being executable by the processor to cause the computer system to:

receive, by a trained classifier system, one or more input data vectors, the trained classifier system capable of classifying input data vectors resulting in a plurality of result label values and respective probability vectors;

predict, based on the one or more received input data vectors, result label values and respective probability vectors using the trained classifier system;

receive feedback data, from one or more users, the feedback data comprising respective feedback label values;

map each of the feedback label values to a respective highest probability dimension value of the related probability vector resulting in an index map;

determine, based on the index map, an evaluation metric value for the quality of the trained classifier system; and use a mean probability dimension value for input data vectors that correspond to feedback label values and unknown label values which are omitted from the index map.

11. The system as in claim 10, wherein no feedback data is received for one or more of the input data vectors, further comprising:

determining a mean probability dimension value to be used for the input data vectors for which no feedback data is received, the mean probability dimension being based on the received feedback data.

12. The system as in claim 11, further comprising:

determining an estimation error for a standard error of the mean probability dimension value based on a distribution of the probability values of all the input data vectors for which not feedback data is received.

13. The system as in claim 10, wherein mapping the feedback label values and determining the evaluation metric value is performed after a predefined number of feedback data records have been received.

14. The system as in claim 10, wherein mapping the feedback label values and determining the evaluation metric value is performed on a predefined schedule.

15. The system as in claim 10, wherein the index map has only mapping values for a subset of classes.

16. The system as in claim 10 wherein the evaluation metric comprises at least one of the group consisting of: a log-loss metric, and a Brier loss metric.

17. The system as in claim 10, wherein the trained classifier system is based on a framework selected out of the group consisting of: scikit, spark ml, keras, caffe, pytorch and, tensorflow.

18. The system as in claim 10, wherein the trained classifier system is a neural network.

19. A computer program product for determining an evaluation metric value for a multi-class classifier with unknown label values, the computer program product comprising:

a computer-readable storage medium having program instructions embodied therewith, wherein a computer readable storage medium is not a transitory signal per se, the program instructions executable by the computer to cause the computer to perform a method, comprising:

receiving, by a trained classifier system, one or more input data vectors, the trained classifier system capable of classifying input data vectors resulting in a plurality of result label values and respective probability vectors;

predicting, based on the one or more received input data vectors, result label values and respective probability vectors using the trained classifier system;

receiving feedback data, from one or more users, the feedback data comprising respective feedback label values;

mapping each of the feedback label values to a respective highest probability dimension value of the related probability vector resulting in an index map;

determining, based on the index map, an evaluation metric value for the quality of the trained classifier system; and using a mean probability dimension value for input data vectors that correspond to feedback label values and unknown label values which are omitted from the index map.

20. The computer program product as in claim 19, further comprising:

determining a mean probability dimension value to be used for the input data vectors for which no feedback data is received, the mean probability dimension being based on the received feedback data; and determining an estimation error for a standard error of the mean probability dimension value based on a distribution of the probability values of all the input data vectors for which not feedback data is received.

* * * * *